United States Patent Office 3,488,338
Patented Jan. 6, 1970

3,488,338
SHORT-STOPPING THE POLYMERIZATION
OF CHLOROPRENE
Hubert Charles Bailey, London, and Frederick James Bellringer, Leatherhead, England, assignors to BP Chemicals (U.K.) Limited, formerly known as Distillers Chemicals and Plastics Limited, London, England, a British company
No Drawing. Filed Apr. 19, 1967, Ser. No. 631,861
Int. Cl. C08d 1/36, 3/14
U.S. Cl. 260—92.3                          15 Claims

ABSTRACT OF THE DISCLOSURE

A process for polymerizing chloroprene either alone or with up to 20% of a co-monomer, in aqueous emulsion in which the polymerization is stopped by addition of a "short-stop" comprising a nitroxide having the structure

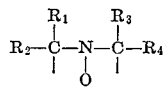

in which $R_1$ to $R_4$ are alkyl groups and no hydrogen is bound to the two remaining valencies on the carbon atoms bound to nitrogen.

---

The present invention is concerned with improvements in or relating to a process for making chloroprene (2-chloro-1,3-butadiene) polymers and to the polymer formed by the process.

It is known that it is necessary to stop the polymerization of 2-chloro-1,3-butadiene before all the monomer has polymerized in order to obtain commercially useful products. To stop the polymerization it is customary to add a "short stop" agent to the reaction mixture when the desired proportion of monomer has polymerized.

The "short stop" agents generally used are not entirely satisfactory. For example some are not completely effective in the proportions which it is practical to use and allow some further polymerization to take place after they have been added. The higher the temperature the less effective they become; thus rapid cooling of the reaction mixture after addition of the "short stop" agent is necessary. The majority of "short stop" agents e.g. tertiary butyl catechol, phenothiazine, hydroquinone, and water soluble dithiocarbamate salts tend to discolour the polymer since they are either coloured or tend to form coloured derivatives. They can in consequence be used only in limited amounts. Many are antioxidants which require the presence of oxygen to function efficiently and oxygen is undesirable in a reaction mixture containing unpolymerized chloroprene.

It is an object of the present invention to provide an improved process for making chloroprene polymers involving the use of a "short stop" agent or agents.

The process for making chloroprene polymers according to the present invention comprises polymerizing 2-chloro-1,3-butadiene, or 2-chloro-1,3-butadiene and no more than 20% by weight based on the total weight of monomeric material of a copolymerizable monomer, or monomers in an aqueous emulsion system and stopping the polymerization while the emulsion contains unpolymerized 2-chloro-1,3-butadiene by addition of a "short stop" agent comprising a nitroxide having the essential skeletal structure.

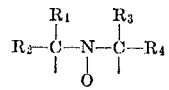

(1)

wherein $R_1$ to $R_4$ are alkyl groups and no hydrogen is bound to the remaining valencies.

The "short stop" agents of the present invention are more effective in stopping polymerization than short stopping agents such as t-butyl catechol and phenothiazine which are well-known "short stop" agents for chloroprene polymerization, and the short stop agents of the present invention do not require cooling of the mixture being polymerized. The ability to carry out short-stopping without cooling the mixture being polymerized is an important advantage of the process of the present invention. In processes for the polymerization of chloroprene it is necessary to remove unreacted monomer generally by distillation after short-stopping has taken place. Where a short stop is used which is only effective when the mixture being polymerized is cooled the subsequent removal of monomer by distillation will involve an additional heating step. The process of the present invention enables the degree of both cooling and subsequent heating of the mixture to be reduced or eliminated.

The use of the short stopping agents of the present invention also reduces the likelihood of discolouration of the polymer. The short-stops of the present invention have the further advantage that although they do not require the presence of oxygen satisfactory short-stopping can still be obtained in the presence of small quantities of oxygen. Furthermore as many of the nitroxides of the present invention are liquids it is easy to measure the correct quantity of short-stopping agent into the reaction mixture and the necessity for making up solutions of the short-stop is avoided. The nitroxides of Formula 1 are effective at low concentrations which reduces any contamination effect resulting from the use of "short-stops."

It is not sufficient that the short-stop added should be a nitroxide. It should be a nitroxide having the essential skeletal structure (1) given above, as the nitroxide structure

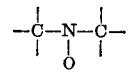

is not by itself sufficient to give satisfactory short-stop performance in molecules containing it. Thus a compound such as

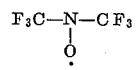

will not be a satisfactory short-stop.

The alkyl groups $R_1$ to $R_4$ may be the same or different, and preferably contain 1 to 15 carbon atoms. It is particularly preferred to use nitroxides having the essential skeletal structure (1) in which $R_1$ to $R_4$ are methyl, ethyl or propyl groups.

The remaining valencies of the carbon atoms in the essential skeletal structure which are not satisfied by $R_1$ to $R_4$ may be satisfied by any atom or group except hydrogen which can bond covalently to carbon although the use of groups which may adversely affect the stabilizing power of the nitroxide structure (1) are undesirable. Examples of suitable atoms or groups are halogen, cyanide,

where R is an alkyl or aryl,

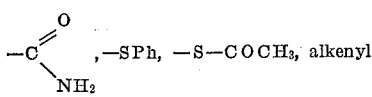, —SPh, —S—COCH₃, alkenyl where the double bond is not in conjugation with the group

and alkyl. The two remaining valencies may also form part of a ring. Examples of suitable compounds having the essential skeletal structure (1) and in which the remaining valencies of (1) form part of the ring are pyrrolidine-1-oxyls and piperidine-1-oxyls. A particular example of a suitable compounds in which the remaining valencies of the essential skeletal structure (1) form part of a ring, is 2,2,6,6 tetramethyl-4-hydroxy-piperidine-1-oxyl.

Where the remaining valencies of (1) are satisfied by alkyl groups $R_5$, $R_6$ to give a compound of formula:

the groups $R_5$ to $R_6$ preferably contain 1 to 15 carbon atoms. Examples of suitable groups $R_5$ and $R_6$ are methyl, ethyl and propyl groups. A specific example of a suitable compound having the essential structure (1) is di-tert-butyl nitroxide.

The 2-chloro-1,3-butadiene may be the sole polymerisable monomer.

The copolymerisable monomer if present can be any monomer containing ethylenic unsaturation capable of undergoing addition polymerisation with 2-chloro-1,3-butadiene. Some examples are styrene, acrylonitrile and 2,3-dichloro-1,3-butadiene.

The polymerisation of 2-chloro-1,3-butadiene in aqueous emulsion systems is well known and any such system can be employed. Any conventional emulsifying agents may be used in making the emulsion. These agents include the sodium, potassium or ammonium salts of long chain fatty acids; salts of rosins and rosin derivatives such as wood rosin, disproportionated rosin or hydrogenated rosin; higher alcohol sulphates; aryl sulphonic acids and formaldehyde condensates of aryl sulphonic acids and their salts. Some examples are the potassium salt of a disproportionated rosin acid, the sodium salt of a condensate of formaldehyde and naphthalene sulphonic acid, and nonyl benzene sulphonic acid. Conventional modifying agents can be present such as for example sulphur, an aliphatic mercaptan, or a dialkyl xanthogen disulphide.

Any polymerisation initiator capable of initiating polymerisation of 2-chloro-1,3-butadiene by way of free radical mechanisms can form part of the aqueous emulsion system. An example of a group of this type of initiator is the organic and inorganic peroxides. Examples of some inorganic peroxides are hydrogen peroxide or the water soluble salts of inorganic peracids such as the persulphates, perborates or percarbonates. The ammonium or alkali metal persulphates are preferred. Some examples of organic peroxides are aryl peroxides such as cumene hydroperoxide. Redox initiating systems such as a peroxide or peracid salt and a reducing agent may be employed. The initiator is usually added to the emulsion system during polymerisation at such a rate that the desired rate of polymerisation is maintained. The rate of polymerisation can be determined by measuring the specific gravity of the emulsion during the polymerisation.

The pH of the emulsion system may be slightly acidic, neutral or in the alkaline range. It is preferred to conduct the polymerisation at a pH in the range 7 to 13.5.

The polymerisation can be and usually is carried out using known techniques in which oxygen is excluded from the atmosphere in the polymerisation vessel. This is conveniently done by sweeping the vessel with a stream of an inert gas such as nitrogen and maintaining an atmosphere of nitrogen above the aqueous emulsion during polymerisation.

The polymerisation is stopped with a "short stop" agent comprising a nitroxide having the essential skeletal structure (1). A nitroxide can be the only "short stop" agent or it can be used in conjunction with one or more other "short stop" agents. Some examples of these agents have already been described.

The amount of nitroxide used to stop polymerisation is not particularly critical. The upper limit is dictated principally by economic considerations. Amounts as little as about 0.5 part per million by weight of nitroxide in relation to the weight of 2-chloro-1,3-butadiene initially present in the aqueous emulsion system can be used in conjunction with another "short stop" agent. Where a nitroxide is the only "short stop" agent a preferred range is 1 to 500 parts per million by weight in relation to the weight of 2-chloro-1,3-butadiene initially present in the aqueous emulsion system, a particularly suitable range being 10–50 parts per million.

The polymerisation can be stopped when the desired proportion of 2-chloro-1,3-butadiene has polymerised. This proportion may be varied widely according to the nature of the rubber desired. Generally it is between 60% and 95% by weight of the 2-chloro-1,3-butadiene initially present in the emulsion system.

The process according to the invention is preferably carried out at the normal polymerisation temperatures in the range 5 to 90° C.

The process can be operated at normal polymerisation temperatures i.e. without forced cooling being required to enable the "short stopping" agent to act satisfactorily. In other words it is not necessary to provide for an increased rate of heat loss from the reaction system, for example by circulation of cooling water, either immediately before, during or immediately after the addition of the nitroxide.

The following examples illustrate the process according to the present invention.

EXAMPLE 1

The following recipe was used to prepared a mercaptan-modified polychloroprene:

Chloroprene ------------------------------g-- 1300
2,6 di-tertiary butyl para-cresol -------------g-- 0.5
Distilled water ---------------------------ml-- 1615
Potassium salt of disproportionated rosin acid
  (80% active) -------------------------g-- 64.0
Sodium salt of condensation product of formaldehyde and naphthalene sulphonic acid ----g-- 9.1
Sodium hydroxide (5% w./v.) -------------ml-- 26
n-Dodecyl mercaptan (97% pure) ----------g-- 2.70

The aqueous phase was charged into the reactor, degassed to remove oxygen and kept under a nitrogen blanket under which the whole reaction took place. The mercaptan was then added to the aqueous phase. The chloroprene was freshly steam-distilled under nitrogen into a receiver containing the 2,6 di-t-butyl p-cresol, which dissolved immediately. The chloroprene solution was added to the aqueous phase in the reactor, and the batch was heated with stirring to 45° C. at which polymerisation was initiated by adding 10 ml. of a catalyst solution made up as follows:

Potassium persulphate --------------------g-- 0.200
Sodium 2-anthraquinone sulphonate ----------- 0.015
Distilled water ---------------------------ml-- 200

After the initial dose of catalyst it was pumped in at 9 ml./hr. until 57% conversion was reached and then stopped, since sufficient catalyst had been added to complete the reaction. At 65 of conversion 14 ml. of the following short stop solution was injected into the reactor:

Di t-butyl nitroxide _____ g__ 0.0587
Toluene _____ ml__ 15.0

After adding the short stop the temperature was maintained at 45° C. for a further 4½ hr. No further polymerisation occurred, so that the short stop was completely effective.

In a parallel reaction, to which no short stop was added, conversion increased to 83% in the same period.

EXAMPLE 2

A sulphur modified polychloroprene was prepared with the following recipe:

Chloroprene _____ g__ 1200
2,6 di-tertiary butyl p-cresol _____ g__ 0.46
Disproportionated rosin acid _____ g__ 48.0
Sulphur _____ g__ 4.5
Distilled water _____ ml__ 1750
Sodium hydroxide _____ g__ 5.7
Trisodium phosphate hydrate _____ g__ 8.5
Sodium salt of a condensation product of formaldehyde and naphthalene sulphonic acid ___g__ 9.0

The aqueous phase was charged into a reactor, degassed to remove oxygen and kept under a nitrogen blanket under which the whole reaction took place. Chloroprene was freshly steam distilled onto the 2,6 di-t-butyl p-cresol which dissolved immediately. The rosin acid and sulphur were dissolved in the chloroprene in a separate stirred vessel and it was then added to the aqueous phase at room temperature. The charge was heated with stirring to 40° C. at which polymerisation was initiated by adding 10 ml. of the following catalyst solution.

Potassium persulphate _____ g__ 0.750
Sodium 2-anthraquinone sulphate _____ 0.015
Distilled water _____ ml__ 200

After the initial dose this catalyst solution was added at the fixed rate of 9 ml./hr. for 2 hours, and then the concentration was doubled to increase the rate of reaction. At 30% conversion the catalyst flow was stopped and 30 mins. later 14 ml. of the following short stop solution was added.

4-hydroxy-2,2,6,6-tetramethyl-piperidine
N-oxyl _____ g__ 0.0196
Toluene _____ ml__ 15.0

Although the temperature of the batch was maintained at 40° C. for a further four hours no more polymerisation occurred. In an exactly parallel reaction in which no short stop was added conversion increased by 4% in the same period.

EXAMPLE 3

The two following solutions were prepared in the absence of oxygen:

Solution A

Chloroprene _____ g__ 1300
2,6 di-t-butyl p-cresol _____ g__ 5.2

Solution B

Potassium salt of disproportionated rosin acid
 (80% active) _____ g__ 81.3
Sodium salt of a condensation product of formaldehyde and naphthalene sulphonic acid ___g__ 9.1
Sodium hydroxide (5% w./v.) _____ ml__ 52
Distilled water _____ ml__ 1625

The whole reaction was carried out in the absence of oxygen.

Solution A was emulsified in Solution B together with 3.5 g. of n-dodecyl mercaptan (98% pure), and heated with agitation to 70° C. When this temperature was reached polymerisation was initiated by adding 9 ml. of an ammonium persulphate solution, the concentration of which was 0.165 g. of the persulphate in 100 ml. of 2½% sodium hydroxide (w./v.). Polymerisation was then sustained by continuous addition of the persulphate solution at the rate of 9 ml./hr. After 2.4 hrs., when 64% of the chloroprene had polymerised, the persulphate feed was stopped and 100 p.p.m. of di-t-butyl nitroxide (by weight on monomer initially charged) was added as a solution in toluene. The temperature was maintained at 70° C. for a further 2.9 hrs. but no more polymerisation occurred.

(b) In a parallel reaction using the same Solution A and B the convention short-stop consisting of a mixture of t-butyl catechol and phenothiazine was used. When 65% of the monomer had polymerized, 2.5 hrs. after the first addition of ammonium persulphate, 21.3 g. of the following emulsion was added:

Inhibitor solution t-Butyl catechol _____ g__ 1
Phenothiazine _____ g__ 1
Toluene _____ g__ 80

Soap solution

Distilled water _____ ml__ 80
Sodium decyl benzene sulphonate _____ g__ 2
Sodium salt of a condensation product of formaldehyde and naphthalene sulphonic acid _____ g__ 1

The inhibitor solution was emulsified in the soap solution. 21.3 g. of the emulsion corresponded to about 100 p.p.m. of t-butyl catechol and 100 p.p.m. of phenothiazine on the original monomer charge.

The temperature was maintained at 70° C. for 2.7 hrs. after addition of the short-stop emulsion. During this time polymerization continued at the average rate of 3.7% of the monomer initially charged/hr.

EXAMPLE 4

A pair of experiments was carried out using solutions made with the same recipe as in Example 3. The same procedure and same catalyst was used as in Example 3.

(a) The first reaction was short-stopped after 2 hrs. when 65% of the monomer had polymerized by the addition of 30 p.p.m. di-t-butyl nitroxide (by wt. on monomer initially charged) as a toluene solution. The temperature was kept at 70° C. for three hours after short-stopping but no further polymerisation occurred.

(b) The second reaction was short-stopped after 2 hrs. when 66% of the monomer had polymerized by the addition of 21.3 g. of the t-butyl catechol/phenothiazine emulsion described in Example 3. The temperature was kept at 70° C. for three hours after short-stopping. During this period polymerisation continued at the rate of 2.3% of the monomer initially charged/hr.

It should be noted that in Example 4(a) a nitroxide concentration of 30 p.p.m. was sufficient to stop further polymerisation completely, while in the comparative test in Example 4(b) polymerisation continued even though a total quality of 200 p.p.m. of short-stopping agent had been added.

We claim:

1. The process for making chloroprene polymers which comprises polymerizing 2-chloro-1,3-butadiene or 2-chloro-1,3-butadiene and no more than 20% by weight based on the total weight of monomeric material with a copolymerizable monomer or monomers in the presence of a free radical initiator, in an aqueous emulsion system and stopping the polymerization while the emulsion contains unpolymerized 2-chloro-1,3-butadiene by addition of a "short-stop" agent comprising a nitroxide having the essential skeletal structure:

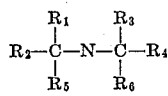

wherein $R_1$ to $R_4$ are alkyl and $R_5$ and $R_6$ are selected from the group consisting of alkyl of 1 to 15 carbon atoms, halogen, cyanide,

where R is alkyl or aryl,

thiophenyl, —S—COCH$_3$ and alkenyl where the double bond is not in conjugation with

2. The process according to claim 1 wherein the sole polymerisable monomer is 2-chloro-1,3-butadiene.

3. The process according to claim 1 herein $R_1$ to $R_4$ each contain 1 to 15 carbon atoms.

4. The process according to claim 3 wherein $R_1$ to $R_4$ are methyl, ethyl or propyl groups.

5. The process according to claim 1 wherein the remaining valencies of the carbon atoms which are not satisfied by $R_1$ to $R_4$ and nitrogen from part of a ring.

6. The process according to claim 1 wherein the alkyl radicals $R_5$ to $R_6$ each contain 1 to 15 carbon atoms.

7. The process according to claim 6 wherein $R_5$ and $R_6$ are methyl, ethyl or propyl.

8. The process according to claim 7 herein the nitroxide having the essential skeletal structure (1) is di-tert-butyl nitroxide.

9. The process according to claim 5 where the nitroxide having the essential skeletal structure (1) is a pyrrolidine-1-oxyl or a piperidine-1-oxyl.

10. The process according to claim 9 where the nitroxide is 2,2,6,6 tetra-methyl-4-hydroxy piperidine-1-oxyl.

11. The process according to claim 4 wherein the total number of carbon atoms in the molecule of the nitroxide having the essential skeletal structure (1) is 8 or 9.

12. The process according to claim 1 wherein the quantity of nitroxide having the essential skeletal structure (1) added to the chloroprene monomer is between 9 and 1000 parts per million parts of chloroprene.

13. The process according to claim 1 wherein the addition of the nitroxide is carried out in the absence of forced cooling.

14. The process according to claim 13 herein the aqueous emulsion is maintained at a temperature in the range 5 to 90° C. after addition of the nitroxide.

15. The process according to claim 14 wherein the aqueous emulsion is maintained at a temperature in the range 50° to 90° C. after addition of the nitroxide.

References Cited

UNITED STATES PATENTS

| | | | |
|---|---|---|---|
| 2,803,623 | 8/1957 | Anderson | 260—92.3 XR |
| 3,231,556 | 1/1966 | Hutchinson | 260—92.3 |

OTHER REFERENCES

Polymerization—Stopping Agents by Antlfinger and Lufter, vol. 45, No. 1—Industrial and Engineering Chemistry, pp. 182–185.

JOSEPH L. SCHOFER, Primary Examiner

WILLIAM F. HAMROCK, Assistant Examiner

U.S. Cl. X.R.

260—80.3, 80.7

PO-1050
(5/69)

UNITED STATES PATENT OFFICE
CERTIFICATE OF CORRECTION

Patent No. 3,488,338    Dated January 6, 1970

Inventor(s) Hubert Charles Bailey et al.

It is certified that error appears in the above-identified patent and that said Letters Patent are hereby corrected as shown below:

In the heading, insert "claims priority of British application No. 18143/66, filed April 26, 1966".

SIGNED AND
SEALED
JUN 16 1970

(SEAL)
Attest:

Edward M. Fletcher, Jr.
Attesting Officer

WILLIAM E. SCHUYLER, J
Commissioner of Patent